(12) United States Patent
Lyuh et al.

(10) Patent No.: US 7,814,296 B2
(45) Date of Patent: Oct. 12, 2010

(54) ARITHMETIC UNITS RESPONSIVE TO COMMON CONTROL SIGNAL TO GENERATE SIGNALS TO SELECTORS FOR SELECTING INSTRUCTIONS FROM AMONG RESPECTIVE PROGRAM MEMORIES FOR SIMD / MIMD PROCESSING CONTROL

(75) Inventors: Chun-Gi Lyuh, Daejeon (KR); Jung-Hee Suk, Daejeon (KR); Ik-Jae Chun, Daejeon (KR); Se-Wan Heo, Daejeon (KR); Tae-Moon Roh, Daejeon (KR); Jong-Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 27 days.

(21) Appl. No.: 12/204,857

(22) Filed: Sep. 5, 2008

(65) Prior Publication Data

US 2009/0282223 A1   Nov. 12, 2009

(30) Foreign Application Priority Data

May 7, 2008   (KR) ...................... 10-2008-0042497

(51) Int. Cl.
G06F 15/80   (2006.01)
(52) U.S. Cl. ........................................ 712/20; 712/221
(58) Field of Classification Search ........................ None
See application file for complete search history.

(56) References Cited

U.S. PATENT DOCUMENTS

| 5,418,915 | A  | * | 5/1995 | Matuda et al. ................. 712/22 |
| 6,272,616 | B1 | * | 8/2001 | Fernando et al. .............. 712/20 |
| 6,446,191 | B1 |   | 9/2002 | Pechanek et al. |
| 7,328,314 | B2 | * | 2/2008 | Kendall et al. ............... 711/148 |
| 2007/0226468 | A1 |   | 9/2007 | Grabner et al. |
| 2007/0250688 | A1 | * | 10/2007 | Kyou ......................... 712/215 |
| 2009/0049275 | A1 | * | 2/2009 | Kyo ............................ 712/20 |
| 2009/0144523 | A1 | * | 6/2009 | Lyuh et al. .................... 712/22 |

FOREIGN PATENT DOCUMENTS

| KR | 1993-0010758 | A1 | 6/1993 |
| KR | 2006-0005292 | A1 | 1/2006 |
| KR | 2007-0083872 | A1 | 8/2007 |
| WO |    2008023576 | A1 | 2/2008 |

* cited by examiner

*Primary Examiner*—Kenneth S Kim
(74) *Attorney, Agent, or Firm*—Ladas & Parry LLP

(57) ABSTRACT

Provided is a data processing circuit. A control unit outputs an operation control signal and a memory control signal. A plurality of program memories each outputs a command in response to the memory control signal. A plurality of arithmetic sections each selectively performs any one of the commands from the plurality of program memories in response to the operation control signal. Operation modes of the data processing circuit can be flexibly changed according to operation environments.

6 Claims, 3 Drawing Sheets

ARITHMETIC UNITS RESPONSIVE TO COMMON CONTROL SIGNAL TO GENERATE SIGNALS TO SELECTORS FOR SELECTING INSTRUCTIONS FROM AMONG RESPECTIVE PROGRAM MEMORIES FOR SIMD / MIMD PROCESSING CONTROL

CROSS-REFERENCE TO RELATED APPLICATIONS

This U.S. non-provisional patent application claims priority under 35 U.S.C. §119 of Korean Patent Application No. 10-2008-0042497, filed on May 7, 2008, the entire contents of which are hereby incorporated by reference.

BACKGROUND OF THE INVENTION

The present invention disclosed herein relates to a data processing circuit, and more particularly, to a data processing circuit that can dynamically realize multiple modes of a parallel processing.

Current semiconductor integration technologies make it possible to arrange two or more processors on a single chip or two or more chips. Parallel arrays of these processors may be classified into Single Instruction stream Single Data stream (SISD), Single Instruction stream Multiple Data stream (SIMD), Multiple Instruction stream Single Data stream (MISD), and Multiple Instruction stream Multiple Data stream (MIMD).

SISD has an architecture that can process only one data at once by one instruction. SIMD has an architecture that two or more arithmetic units (or processors) execute a single instruction simultaneously according to a control of a single control unit. The two or more arithmetic units may use different data in the course of executing an instruction. SIMD architecture has an advantage in that a minimal program memory is used to control many arithmetic units, but it fails to perform various arithmetic operations simultaneously.

MISD has an architecture that multiple processors process different instructions but processing data is one. MIMD has an architecture that multiple arithmetic units process different instructions and data according to control of one control unit. The MIMD architecture has a disadvantage that the size of a program memory increases in order to control the multiple arithmetic units but has an advantage of high processing efficiency since it can perform various arithmetic operations.

Recently, a multiple SIMD architecture combining the SIMD architecture and the MIMD architecture has been proposed. Like in the MIMD architecture, in the multiple SIMD architecture, a single instruction is read out of each of a plurality of program memories and a plurality of arithmetic units perform arithmetic operations on different data. Each of the plurality of arithmetic units includes two or more SIMD arithmetic circuits, which perform the same arithmetic operation. Since the multiple SIMD architecture uses a program memory smaller than that of the MIMD architecture but has to control two or more arithmetic units simultaneously, it has a limitation in performing various arithmetic operations.

A multimode parallel processor architecture includes two or more controllers, each being capable of independently controlling a corresponding memory and arithmetic unit. However, since the multimode parallel processor architecture needs a number of controllers equal to the number of arithmetic units, its hardware size increases and power consumption increases too.

The above-described processor architectures have their respective advantages and disadvantages. Accordingly, there is required a data processing circuit having an architecture in which operation modes may be flexibly changed according to operating environments.

SUMMARY OF THE INVENTION

The present invention provides a data processing circuit of which operation mode can be efficiently changed.

Embodiments of the present invention provide data processing circuits including a control unit outputting an operation control signal and a memory control signal, a plurality of program memories each outputting a command in response to the memory control signal, and a plurality of arithmetic sections each selectively performing any one of the commands from the plurality of program memories in response to the operation control signal.

In some embodiments, each of the plurality of arithmetic sections includes an arithmetic unit outputting a memory selection signal in response to the operation control signal, and a selector providing the arithmetic unit with the command outputted from any one of the plurality of program memories in response to the memory selection signal, wherein the arithmetic unit performs a command provided from the selector.

In other embodiments, in an SIMD (Single Instruction stream Multiple Data stream) mode, the operation control signal outputted from the control unit comprises an SIMD mode signal and a memory selection control signal.

In still other embodiments, the arithmetic unit of each of the plurality of arithmetic sections outputs the memory selection signal such that the program memory designated by the operation control signal is selected from the plurality of program memories.

In even other embodiments, in an MIMD (Multiple Instruction stream Multiple Data stream) mode, the operation control signal outputted from the control unit comprises an MIMD mode signal.

In yet other embodiments, the arithmetic unit of each of the plurality of arithmetic sections comprises a memory selection register which stores memory information on the program memory in which a next command is stored.

In further embodiments, the arithmetic unit of each of the plurality of arithmetic sections outputs the memory selection signal corresponding to the memory information stored in the memory selection register when the operation control signal is the MIMD mode signal.

In still further embodiments, the memory control signal outputted from the control unit comprises an address in which a command to be read out of the plurality of program memories is stored.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Hereinafter, exemplary embodiments of the present invention will be described in detail with reference to the accompanying drawings.

Figure 1:
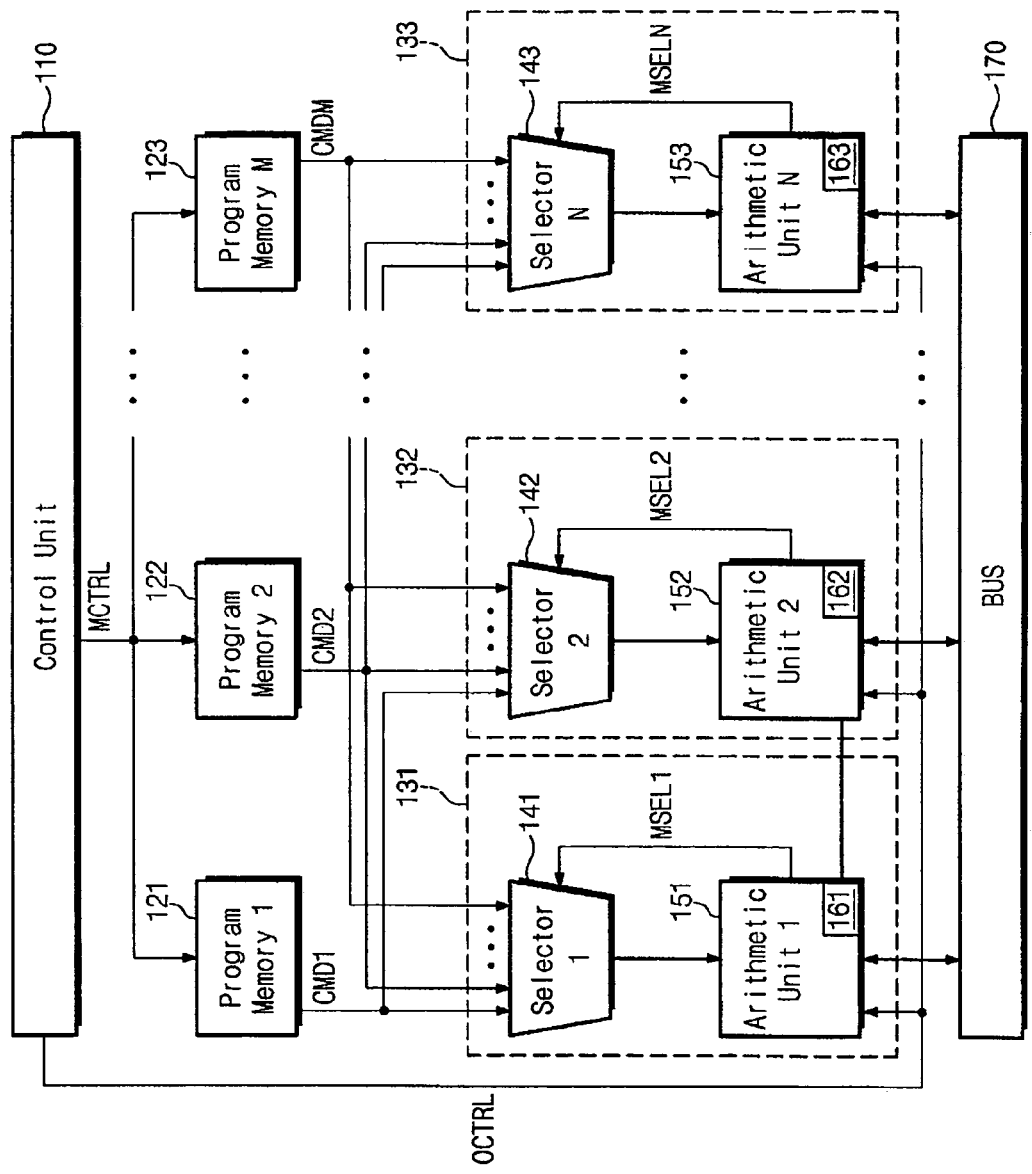
FIG. 1 illustrates a data processing circuit according to an embodiment of the present invention.

FIG. 1 illustrates a data processing circuit according to an embodiment of the present invention.

Referring to FIG. 1, the data processing circuit 100 includes a control unit 110, a plurality of program memories 121-123, a plurality of arithmetic sections 131-133, and a bus 170. The control unit 111 outputs a memory control signal MCTRL for controlling the plurality of program memories 121-123, and an operation control signal OCTRL for controlling the plurality of arithmetic sections 131-133. The operation control signal OCTRL represents an operation mode, and includes a memory selection signal.

Each of the plurality of program memories 121-123 outputs commands CMD1-CMDM in response to the memory control signal MCTRL from the control unit 110. The respective commands CMD1-CMDM are inputted into the plurality of arithmetic sections 131-133. The memory control signal MCTRL from the control unit 110 includes an address in which commands to be read from the plurality of program memories 121-123 are stored. In this embodiment, the plurality of program memories 121-123 is provided in a number M.

Each of the plurality of arithmetic sections 131-133 performs any one among the commands CMD1-CMDM from the control unit 110 in response to the operation control signal OCTRL. In this embodiment, the number of the arithmetic sections 131-133 is N.

The arithmetic section 131 includes a selector 141 and an arithmetic unit 151, the arithmetic section 132 includes a selector 142 and an arithmetic unit 152, and the arithmetic section 133 includes a selector 143 and an arithmetic unit 153.

The arithmetic units 151-153 output memory selection signals MSEL1-MSELN in response to the operation control signal OCTRL from the control unit 110, respectively. The selectors 141-143 correspond to the arithmetic units 151-153, respectively, and provide the corresponding arithmetic units 151-153 with a command outputted from any one of the plurality of program memories 121-123 in response to the memory selection signals MSEL1-MSELN outputted from the corresponding arithmetic units 151-153. The plurality of arithmetic units 151-153 perform commands inputted from the corresponding selectors 141-143, respectively.

The arithmetic units 151-153 include registers 161-163, respectively. The registers 161-163 store information on the program memories in which commands to be performed later are stored. Concrete functions of the registers 161-163 will be described in detail later. Although not shown in the drawings, the arithmetic units 151-153 include not only the registers 161-163 but arithmetic circuits for performing an arithmetic function, and register files for storing an arithmetic result.

The bus 170 interconnects the arithmetic units 151-153. The bus 170 may be replaced by a signal line or various communication networks.

The data processing circuit 100 shown in FIG. 1 may selectively operate in the SIMD mode or MIMD mode. Operations of the data processing circuit 100 will now be described with reference to FIGS. 2 and 3.

Figure 2:
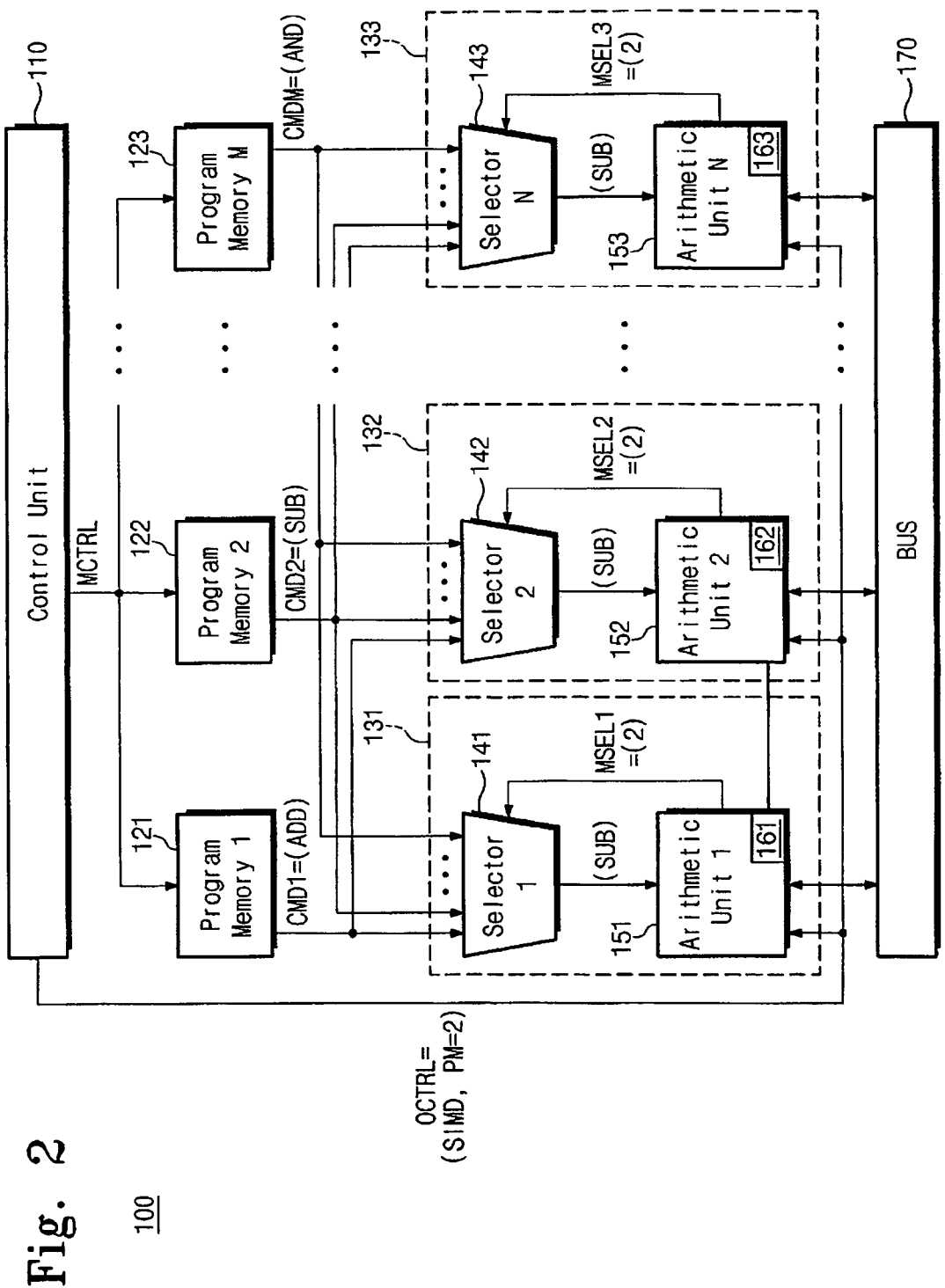
FIG. 2 is a schematic view illustrating values of signals when the data processing circuit shown in FIG. 1 operates in an SIMD mode.

FIG. 2 is a schematic view illustrating values of signals when the data processing circuit 100 shown in FIG. 1 operates in the SIMD mode.

Referring to FIG. 2, when an operation control signal OCTRL outputted from the control unit 110 represents the SIMD mode, the arithmetic units 151-153 output memory selection signals MSEL1-MSELN corresponding to a memory selection control signal PM included in the operation control signal OCTRL. For example, when the memory selection control signal PM indicates the program memory 122, the arithmetic units 151-153 output the memory selection signals MSEL1-MSELN, respectively such that a command SUB outputted from the program memory 122 is selected. The selectors 141-143 deliver the command SUB outputted from the program memory 122 to the arithmetic units 151-153 in response to the corresponding memory selection signals MSEL1-MSELN.

The arithmetic units 151-153 perform arithmetic operations with respect to different data according to the same command. That is, the data processing circuit 100 operates in the SIMD mode.

Figure 3:
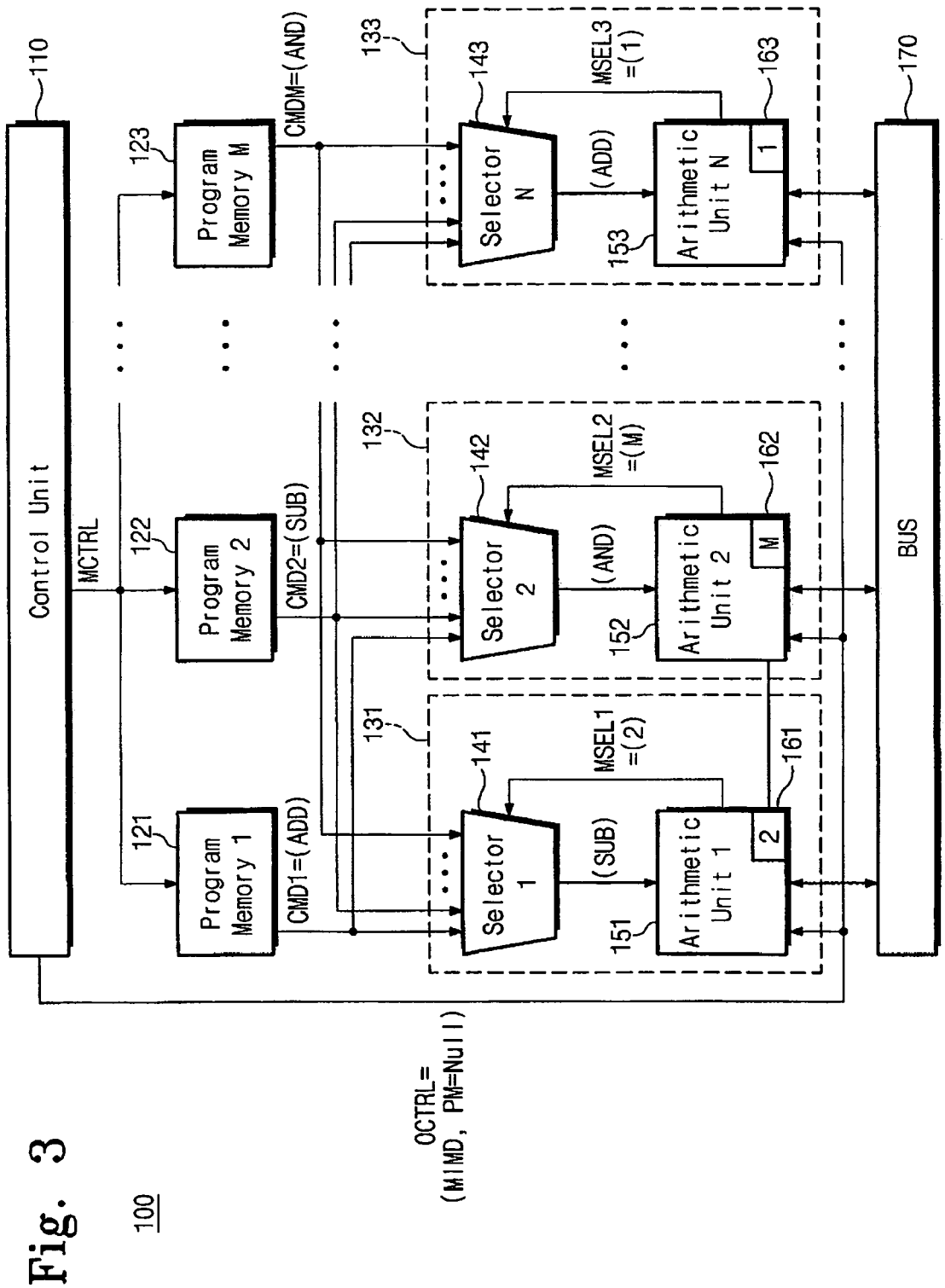
FIG. 3 is a schematic view illustrating values of signals when the data processing circuit shown in FIG. 1 operates in an MIMD mode.

FIG. 3 is a schematic view illustrating values of signals when the data processing circuit 100 shown in FIG. 1 operates in the MIMD mode.

Referring to FIG. 3, when the operation control signal OCTRL outputted from the control unit 110 represents the MIMD mode, the arithmetic units 151-153 output memory selection signals MSEL1-MSELN corresponding to memory information stored in the registers 161-163, respectively. For example, the arithmetic unit 151 stores memory information corresponding to the program memory 122 in the register 161 when as a result of an operation by a previous command, a next command is a command read out of the program memory 122. The arithmetic unit 151 outputs the memory selection signal MSEL1 such that a command outputted from the program memory 122 can be selected according to the memory information stored in the register 161. In the same manner, the arithmetic unit 152 outputs the memory selection signal MSEL2 such that a command outputted from the program memory 123 can be selected, and the arithmetic unit 153 outputs the memory selection signal MSELN such that a command outputted from the program memory 121 can be selected.

The selector 141 delivers the command SUB outputted from the program memory 122 to the arithmetic unit 151 in response to the memory selection signal MSEL1, the selector 142 delivers a command AND outputted from the program memory 123 to the arithmetic unit 152 in response to the memory selection signal MSEL2, and the selector 143 delivers a command ADD outputted from the program memory 121 to the arithmetic unit 153 in response to the memory selection signal MSELN.

The arithmetic units 151-153 perform arithmetic operations with respect to different data according to different commands SUB, AND, ADD. That is, the data processing circuit 100 operates in the MIMD mode.

In general, the SIMD architecture is configured such that arithmetic units connected in parallel perform the same arithmetic operation. In order for the respective arithmetic units to perform different arithmetic operations according to data, it is required that all the arithmetic units perform the same arithmetic operation and then select necessary values. In this case, as data types become more varied, efficiency is lowered due to parallel arithmetic operation.

The MIMD architecture has to store all commands necessary for the respective arithmetic units in a program memory in order for the arithmetic units connected in parallel to perform different commands. Accordingly, the program memory has to have a sufficiently large memory size. In particular, in the case of processing multimedia data using a data processing circuit having the MIMD architecture, the size of the program memory is a burden, and power consumption increases too.

The data processing circuits 100 according to embodiments of the present invention includes the single control unit 110, the plurality of program memories 121-123, and the plurality of arithmetic sections 131-133, and can selectively operate in either SIMD mode or MIMD mode. For example, when the same arithmetic operation should be repeatedly performed, the data processing circuit 100 operates in the SIMD mode, and when the arithmetic sections 131-133 should perform different arithmetic operations, the data processing circuit 100 operates in the MIMD mode such that each of the arithmetic sections 131-133 can directly select a command and operate, so that the efficiency of the parallel arithmetic operation is increased. In this embodiment, while the number of the program memories 121-123 is set to be M and the number of the arithmetic sections 131-133 is set to be N, the numbers of the program memories and the arithmetic sections may be changed into various values.

Data processing circuits according to embodiments of the present invention have an architecture in which operation modes may be flexibly changed according to operating environments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data processing circuit comprising:
a control unit outputting an operation control signal and a memory control signal;
a plurality of program memories each outputting an associated command in response to the memory control signal; and
a plurality of arithmetic sections wherein each arithmetic section is adapted to receive the associated command from each of the plurality of program memories and wherein each arithmetic section performs at least one of the associated commands in response to the operation control signal, wherein each of the plurality of arithmetic sections comprises:
an arithmetic unit outputting a memory selection signal in response to the operation control signal; and
a selector providing the arithmetic unit with the command outputted from any one of the plurality of program memories in response to the memory selection signal,
wherein the arithmetic unit performs a command provided from the selector.

2. The data processing circuit of claim 1, wherein in an SIMD (Single Instruction stream Multiple Data stream) mode, the operation control signal outputted from the control unit comprises an SIMD mode signal and a memory selection control signal.

3. The data processing circuit of claim 2, wherein the arithmetic unit of each of the plurality of arithmetic sections outputs the memory selection signal such that the program memory designated by the operation control signal is selected from the plurality of program memories.

4. The data processing circuit of claim 1, wherein in an MIMD (Multiple Instruction stream Multiple Data stream) mode, the operation control signal outputted from the control unit comprises an MIMD mode signal.

5. The data processing circuit of claim 4, wherein the arithmetic unit of each of the plurality of arithmetic sections comprises a memory selection register which stores memory information on the program memory in which a next command is stored.

6. The data processing circuit of claim 5, wherein the arithmetic unit of each of the plurality of arithmetic sections outputs the memory selection signal corresponding to the memory information stored in the memory selection register when the operation control signal is the MIMD mode signal.

* * * * *